United States Patent [19]

Branlard et al.

[11] E Patent Number: Re. 33,377

[45] Reissued Date of Patent: Oct. 9, 1990

[54] METHOD OF PREPARING SULFUR-MODIFIED POLYCHLOROPRENE

[75] Inventors: Paul Branlard, Grenoble; Jean-Pierre Merle, Echirolles, both of France

[73] Assignee: Distugil, Neuilly-sur-Seine, France

[21] Appl. No.: 262,187

[22] Filed: Oct. 20, 1988

Related U.S. Patent Documents

Reissue of:

[64] Patent No.: 4,255,539
Issued: Mar. 10, 1981
Appl. No.: 89,,732
Filed: Oct. 31, 1979

U.S. Applications:

[63] Continuation of Ser. No. 117,405, Nov. 2, 1987, abandoned, which is a continuation of Ser. No. 506,788, Jun. 22, 1983, abandoned.

[51] Int. Cl.[5] ..... G08F 8/00; G08F 8/34

[52] U.S. Cl. ..... 525/345; 525/351; 526/220; 526/223; 528/376

[58] Field of Search ..... 525/330, 351; 526/220, 526/223; 528/376

[56] References Cited

U.S. PATENT DOCUMENTS

| | | | |
|---|---|---|---|
| 2,234,215 | 3/1941 | Youker | 528/376 |
| 2,264,173 | 11/1941 | Collins | 526/223 |
| 3,392,134 | 7/1968 | Apotheker | 526/223 |
| 3,492,276 | 1/1970 | Smith | 526/223 |
| 3,704,283 | 11/1972 | Mayer-Mader | 526/220 |
| 3,984,609 | 10/1976 | Branlard et al. | 526/223 |
| 4,121,033 | 10/1978 | Edmondson | 526/223 |

FOREIGN PATENT DOCUMENTS

| | | |
|---|---|---|
| 1376314 | 9/1964 | France . |
| 1392446 | 2/1965 | France . |
| 1393099 | 2/1965 | France . |
| 1398602 | 3/1965 | France . |
| 1457004 | 4/1966 | France . |
| 2076922 | 7/1971 | France . |
| 2089811 | 12/1971 | France . |

*Primary Examiner*—Paul R. Michl
*Assistant Examiner*—Patrick A. Doody
*Attorney, Agent, or Firm*—Burns, Doane, Swecker & Mathis

[57] ABSTRACT

Sulfur-modified polychloroprene in alkaline aqueous emulsion is prepared by incorporating one or more organic polysulfides which act as peptizing agents during the polymerization of the chloroprene. The sulfur-modified polychloroprenes obtained have stable viscosities.

21 Claims, No Drawings

METHOD OF PREPARING SULFUR-MODIFIED POLYCHLOROPRENE

Matter enclosed in heavy brackets [ ] appears in the original patent but forms no part of this reissue specification; matter printed in italics indicates the additions made by reissue.

*This application is a continuation of application Ser. No. 117,405, filed Nov. 2, 1987, now abandoned, which is a continuation of application Ser. No. 506,788, filed June 22, 1983, now abandoned in turn a reissue of Ser. No. 089,732, filed 10/31/79, now U.S. Pat. No. 4,255,539.*

BACKGROUND OF THE INVENTION

The present invention is directed to an improved method of preparing a sulfur-modified polychloroprene latex.

Sulfur-modified chloroprene polymers are well known. They are obtained by polymerization of chloroprene, possibly with another unsaturated monomer, in the presence of elemental sulfur. The polymer obtained has a structure which is strongly cross-linked via polysulfide bonds and is difficult to work. In order to obtain a product of increased plasticity, the polymer is partially degraded by means of suitable agents which produce a breaking of some of the polysulfide bonds. This operation is referred to as peptization. Suitable plasticizing agents are described in general in U.S. Pat. No. 2,234,215.

Methods of peptization in alkaline aqueous emulsion have been described, for instance in French Pat. Nos. 1,376,314; 1,392,446; 1,393,099; 1,398,602; 2,076,922 and 2,089,811, as well as in U.S. Pat. No. 3,318,832. In accordance with these methods, the peptization is carried out after the polymerization by treating the polymer latex with an alkylthiuram disulfide, combined or not with a xanthogen disulfide or a dialkyldithiocarbamate. The main disadvantage of these processes is the slowness of the peptization (requiring several hours at 40° C.). The reaction proceeds during the treatment of the latex for the elimination of the residual monomer as well as during the phase of isolation of the rubber. Furthermore, the plasticity of the rubbers obtained varies in time, which represents a serious drawback for their use and their conversion into manufactured products.

It is also known, in accordance with a different technique, to increase the plasticity of the sulfur-modified chloroprene polymers by means of modifying agents or chain-transfer agents, such as xanthogen disulfides, iodoform or alkyl mercaptans, which are present during the polymerization and which act as molecular weight regulators. These methods are described, for example, in French Pat. No. 1,457,004 and U.S. Pat. No. 3,397,173. The modified copolymers obtained can still be peptized subsequently.

Finally, French Pat. No. 2,008,562 and its corresponding U.S. Pat. No. 3,808,183 describe a method of preparing polychloroprene modified with sulfur and xanthogen or iodoform in which the polymer latex is peptized instantaneously by means of a thiol.

It is, therefore, an object of the present invention to provide a method of preparing, in a single step, sulfur-modified chloroprene polymers without auxiliary modifying agents, in which the polymerization and the peptization are carried out directly during the polymerization and not after completion of the polymerization, as in accordance with the known methods.

It is also an object of the present invention to provide an improved method for preparing sulfur-modified polychloroprene latices.

Other objects will be apparent to those skilled in the art from the present description.

GENERAL STATEMENT OF THE INVENTION

The method of the invention is conducted by copolymerization of chloroprene with sulfur, the chloroprene optimally being replaced up to 20% of its weight by another copolymerizable vinyl monomer, in alkaline aqueous emulsion, in the presence of a free-radical initiator, said method employing in the reaction mixture, one or more organic polysulfides selected from among the class consisting of:

(a)-the disulfides of di- and tetra-alkylthiurams in which the alkyl group contains from about 3 to 5 carbon atoms;

(b)-benzothiazyl disulfide;

(c)-dibenzyl polysulfides in which the number of sulfur atoms is equal to or greater than 3;

(d)-2,4,5-trifluorophenyl trisulfide; and (e)-benzanilide disulfide. The said polysulfide is introduced before the beginning of the polymerization in proportions of between about 0.01 and 2 parts to 100 parts (by weight) of monomer charged.

The polysulfides which can be employed belong to the general class of plasticizing compounds described in U.S. Pat. No. 2,234,215. These compounds do not all have the same activity. It is known that some of them act in the reaction medium as chain-transfer agents, while others such as disulfides of tetraethyl and tetramethyl thiurams, have a polymerization-retarding or inhibiting effect. By the present invention it has been found that the polysulfides employed in accordance with the invention have no polymerization retarding effect and have a rapid and complete peptizing action so that the polymers obtained can no longer be peptized subsequent to their preparation and do not undergo any change in viscosity during storage.

In combination with the said compounds it is possible, in accordance with one specific embodiment of the method of the invention to use a disulfide or tetrasulfide of tetramethyl or tetraethyl thiuram in an amount of less than 0.25 part per hundred parts by weight of monomer. The polymerization is [carred] *carried* out in alkaline aqueous emulsion in known manner in the presence of free-radical producers, such as hydrogen peroxide, the organic peroxides, cumyl peroxide, dibenzoyl peroxide, alkaline-metal or ammonium ferricyanides and, preferably alkaline-metal or ammonium persulfates.

As emulsifying agents there can be employed any of the usual compounds or mixture of usual compounds, such as water-soluble salts of acids derived from crude dimutated hydrogenated or partially polymerized rosins derived from pine oleoresin, wood, or tall oil. The emulsion generally contains a certain amount of dispersing and stabilizing agents, such as the fatty alcohol sulfates, alkyl sulfates and sulfonates, the alkaline salts of alkyl aryl sulfonic acids and, more particularly, the alkaline salts of methylene-bis-naphthalene sulfonic acid. Small amounts of a conventional chain transfer agent can also be added.

Up to 20% of the weight of the chloroprene monomer can be replaced by another copolymerizable monomer. Among the monomers which are copolymerizable with chloroprene are the vinyl aromatic compounds, such as styrene, the vinyl toluenes, and vinyl naphthalenes, the acrylic and methacrylic acids, as well as their ester and nitrile derivatives, such as ethyl acrylate, methyl methacrylate and acrylonitrile, the aliphatic conjugated diolefines, such as 1,3-butadiene, isoprene, 2,3-dichloro-1, 3-butadiene and 2,3-dimethyl-1, 3-butadiene, and the vinyl ethers and ketones, such as methyl vinyl ether, vinyl acetate and methyl vinyl ketone.

The concentration of the monomer or monomers in the emulsion is generally between about 30 and 60% by weight, referred to the total weight of the emulsion.

The amount of sulfur may vary from about 0.1 to 0.6% by weight, referred to the chloroprene monomer or the mixture of monomers.

The polysulfides which can be employed in the method of the invention are introduced into the reaction medium at the same time as the other reagents, but before the start of the polymerization.

The polymerization temperature may vary from about 10° C. to 80° C., but it is preferably between about 40° C. and 60° C.

The pH of the emulsion during the polymerization is greater than about 10 and preferably between about 11 and 13.

The final conversion content does not present any particular limit and it may vary from about 50 to 90%, and, preferably, from about 75% to 85%.

The polymerization can be stopped at any time by addition of a conventional polymerization-inhibiting agent.

The residual monomer is eliminated by flash distillation and the resulting rubber is isolated from the resulting latex by any known means.

The process of the invention has an appreciable economic advantage due to the fact that it is carried out in a single step without increasing the duration of the polymerization. Furthermore, the amount of peptizing agent necessary can be decreased to one-third of its value as compared with the conventional two-step processes of the prior art.

The chloroprene polymers obtained have a Mooney viscosity of between about 20 and 100 and, preferably, between about 35 and 70. This value is stable and does not change during the storage of the latex or the treatment of the rubber. The value desired can be fixed by the man skilled in the art by means of a few preliminary tests as a function of the amount of sulfur, the nature and concentration of peptizing agent, as well as the polymerization conditions. The polychloroprenes can be vulcanized with the vulcanization systems customarily employed for sulfur-modified polychloroprenes, without addition of accelerators derived from thiourea, and in the same manner as the polychloroprenes peptized in conventional manner by thiurams. The vulcanized products have excellent mechanical properties. They are superior to the polychloroprenes peptized or modified in accordance with the prior art with respect to the values of compression-set and tear-strength. Therefore, they are particularly suitable for the manufacture of technical parts such as joints and damping members.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

A sulfur-modified polychloroprene latex is prepared by means of an aqueous emulsion system of the following composition:

| | Parts |
|---|---|
| chloroprene | 100 |
| resin acid: dismutated rosin | 4 |
| sulfur | 0.20 |
| tetrabutylthiuram disulfide | 1 |
| water | 100 |
| sodium hydroxide (100%) | 0.64 |
| sodium salt of methylene-bis-alkyl-naphthalene sulfonic acids | 0.70 |
| Catalyst solution to be added to the emulsion system: | |
| sodium persulfate | 1 |
| water | 99 |

The polymerization is effected at 50° C. in a nitrogen atmosphere at a pH of 12.9 and the catalyst solution is added continuously at a rate so as to obtain a uniform rate of polymerization (the total amount introduced is about 5 parts by weight of the weight of the emulsion system). After 4 hours and 15 minutes the conversion of the monomer is 80%. The polymerization is stopped by adding 0.01 part of p-tertiarybutyl catechol and 0.01 part of phenothiazine in the form of an emulsion. The latex is then treated with steam to eliminate the residual monomer and then cooled. After isolation of the polymer by coagulation on a cold drum, the measurement of the Mooney viscosity (ML 1+4 at 100° C.) gives a value of 50.

COMPARATIVE TEST A

A test is carried out under the same operating conditions as in the above example, but without adding thiuram during the polymerization. After the termination of the polymerization, the polymer, isolated on a sample of latex, has a viscosity of 170. One part of tetraethylthiuram disulfide is then introduced into the latex; the latex is stirred for four hours at 45° C. and treated by the customary method. The Mooney viscosity of the polymer obtained is 155 and the material is very unstable upon storage.

COMPARATIVE TEST B (Peptization process of the prior art)

The test is again carried out by this time without thiuram and the amount of sulfur is increased to 0.6 parts. After the termination of the polymerization, 1.6 part of tetraethylthiuram disulfide is added. The latex is stirred for 4 hours at 45° C. and treated in accordance with the customary method. The Mooney viscosity of the polymer obtained is 50.

COMPARATIVE TEST C (Modified non-peptized polymer in accordance with the prior art)

The test is again carried out replacing the tetrabutylthiuram disulfide by 0.4 part of diisopropyl xanthogen disulfide. The amount of sulfur is 0.6 part. The polymer isolated after the termination of the polymerization has a Mooney viscosity of 50.

MECHANICAL PROPERTIES OF THE FOREGOING POLYMERS

The polychloroprene obtained in accordance with each of Example 1 and Comparative Tests B and C mixed with the following components:

| | Parts by weight |
|---|---|
| polychloroprene | 100 |
| magnesium oxide | 4 |
| zinc oxide | 5 |
| stearic acid | 0.5 |
| phenyl-$\beta$-naphthylamine | 2 |
| SRF black | 75 |
| aromatic extending oil (DURTREX 729 FC of Shell Oil) | 15 |

Vulcanization is carried out at 153° C., for 40 minutes. The properties of the vulcanized products are entered in Table I below:

TABLE I

Compression Set-ASTM standard 395-61-Method B-after 96 hours at 100° C.-Tear strength-ASTM Standard D 624-73-Angular Test Piece C

| Polychloroprene | Compression Set % | Tear strength in kg/cm |
|---|---|---|
| Example 1 | 54 | 63 |
| Comparative Test B | 63 | 54 |
| Comparative Test C | 64 | 44 |

EXAMPLES 2 to 9

A polychloroprene is prepared in the same manner and using the emulsifying system described in Example 1, above. The nature and quantity of the thiuram or of a mixture of thiurams in accordance with the invention is varied. The amount of sulfur, the polymerization temperature and the degree of conversion of the monomer are also varied (the polymerization time is 4 to 5 hours). These changes and the viscosity values measured on the polymer obtained are set forth in Table II, below. In Table II the following abbreviations are employed:

TETD—tetraethylthiuram disulfide
TITD—tetraisopropylthiuram disulfide
TBTD—tetrabutylthiuram disulfide
DPTD—dipentamethylene thiuram disulfide
DPTT—dipentamethylene thiuram tetrasulfide The results obtained and set forth in Table II show that the method of the invention makes it possible to obtain stable Mooney viscosity values within the range of about 30 to 65. Example E in Table II, given by way of comparison, shows that the thiuram tetrasulfide used does not operate as peptizing agent in the method of the invention.

TABLE II

| Examples | Sulfur-parts by Weight | Thiuram | parts by Wt. | Operating conditions T (°C.) | Conversion % | Mooney viscosity ML 1 + 4 – 100° C. |
|---|---|---|---|---|---|---|
| 2 | 0.1 | TBTD | 2 | 40 | 60 | 60 |
| 3 | 0.6 | TITD | 0.6 | 40 | 80 | 47 |
| 4 | 0.2 | TBTD | 0.8 | 50 | 70 | 66 |
| | | TETD | 0.2 | | | |
| 5 | 0.6 | TBTD | 0.1 | 45 | 70 | 39 |
| | | TETD | 0.1 | | | |
| 6 | 0.2 | TBTD | 1.3 | 30 | 80 | 62 |
| | | TETD | 0.2 | | | |
| 7 | 0.2 | DPTD | 0.5 | 40 | 80 | 75 |
| 8 | 0.2 | DPTD | 0.8 | 40 | 80 | 57 |
| 9 | 0.2 | DPTD | 1 | 40 | 80 | 30 |
| E | 0.2 | DPTT | 1 | 50 | 80 | 170 |

EXAMPLES 10 to 13

The thiuram sulfide employed in the foregoing examples is replaced by a different polysulfide. 0.2 part of sulfur is used. The polymerization is carried out at 50° C. and is terminated when the conversion of the monomer into polymer reaches 80%. The total time of the polymerization varies from 4.5 to 5 hours. The results are entered in Table III, below. Examples, F, G, H are given by way of comparison.

TABLE III

| Examples | 10 | F | 11 | 12 | G | H | 13 |
|---|---|---|---|---|---|---|---|
| Polysulfide (parts by weight) | | | | | | | |
| Benzothiazyl disulfide | 1 | | | | | | |
| Mercaptobenzothiazol | | 1 | | | | | |
| Benzanilide disulfide | | | 0.5 | | | | |
| Benzyl polysulfide | | | | 1.1 | | | |
| Benzyl disulfide | | | | | 1.1 | | |
| Benzoyl disulfide | | | | | | 1 | |
| 2,4,5-trichlorophenyl-trisulfide | | | | | | | 1 |
| Mooney viscosity (ML 1 + 4 – 100° C.) | 43 | 170 | 41 | 65 | 150 | 180 | 52 |

The terms and expressions which have been employed are used as terms of description and not of limitation, and there is no intention in the use of such terms and expressions of excluding any equivalents of the features shown and described or portions thereof, but is recognized that various modifications are possible within the scope of the invention claimed.

What is claimed is:

1. A method of preparing sulfur-modified polychloroprene by copolymerization of chloroprene *and an ethylenically unsaturated copolymerizable monomer* with sulfur, in alkaline aqueous emulsions and in the presence of a free-radical initiator, at least one organic [polysulfides] *polysulfide* selected from the class consisting of:

(a) di- and tetra-alkylthiuram disulfides in which the alkyl group contains from about 3 to 5 carbon atoms;
(b) benzothiazyl disulfide;
(c) benzyl polysulfides in which the number of sulfur atoms is equal to or greater than 3;
(d) 2,4,5-trichlorophenyl trisulfide; and
(e) benzanilide disulfide [and] the said polysulfide [is] *being* introduced before the initiation of the polymerization in proportions of between about 0.1 and 2 parts to 100 parts, by weight, or chloroprene charged, *and the ethylenically unsaturated copolymerizable monomer being present at up to about 20% by weight of chloroprene.*

[2. A method according to claim 1, wherein up to about 20% by weight of the chloroprene is replaced by an ethylenically unsaturated copolymerizable monomer.]

3. A method according to claim 1, wherein there is also [subsequently] added *in combination with said polysulfide* a tetramethyl or tetraethyl thiuram disulfide or tetrasulfide in an amount of less than 0.25 part per 100 parts, by weight of chloroprene.

4. A method according to [any of] claims 1[, 2] or 3, wherein the amount of sulfur is between about 0.1 and 0.6% by weight referred to the [chlorprene] *chloroprene* and copolymerizable ethylenically unsaturated monomer.

5. A method according to claim 1, wherein the free-radical initiator is a member selected from the class consisting of hydrogen peroxide, cumyl peroxide, dibenzoyl peroxide, a ferricyanide and a persulfate.

6. A method according to claim [2] *1*, wherein the copolymerizable monomer is a member selected from the class consisting of vinyl aromatic compounds, acrylic acids, aliphatic conjugated diolefins, vinyl ethers, and vinyl ketones.

7. A method according to claim 1, wherein the polymerization is conducted at a temperature of between about 10° and 80° C.

8. A method according to claim 1, wherein the amount of sulfur is between about 0.1 and 0.6% by weight of chloroprene.

9. A method according to claim 1, wherein the pH is at least about 10.

*10. A method of preparing sulfur-modified polychloroprene by copolymerization of chloroprene with sulfur, in alkaline aqueous emulsion and in the presence of a free-radical initiator, comprising introducing at least one organic polysulfide selected from the class consisting of:*

*(a) benzothiazyl disulfide;*

*(b) benzyl polysulfides in which the number of sulfur atoms is equal to or greater than 3;*

*(c) 2,4,5-trichlorophenyl trisulfide; and*

*(d) benzanilide disulfide, and the said polysulfide is introduced before the initiation of the polymerization in proportions of between about 0.1 and 2 parts to 100 parts, by weight, of chloroprene charged.*

*11. A method according to claim 10, wherein up to about 20% by weight of the chloroprene is replaced by an ethylenically unsaturated copolymerizable monomer.*

*12. A method according to claim 10, wherein there is also added in combination with said polysulfide a tetramethyl or tetraethyl thiuram disulfide or tetrasulfide in an amount of less than 0.25 part per 100 parts, by weight of chloroprene, the said tetramethyl or tetraethyl thiuram disulfide or tetrasulfide being introduced at the same time before the initiation of the polymerization.*

*13. A method according to claim 10, wherein the amount of sulfur is between about 0.1 and 0.6% by weight referred to the chloroprene and copolymerizable ethylenically unsaturated monomer.*

*14. A method according to claim 10, wherein the free-radical initiator is a member selected from the class consisting of hydrogen peroxide, cumyl peroxide, dibenzoyl peroxide, a ferricyanide and a persulfate.*

*15. A method according to claim 11, wherein the copolymerizable monomer is a member selected from the class consisting of vinyl aromatic compounds, acrylic acids, aliphatic conjugated diolefins, vinyl ethers, and vinyl ketones.*

*16. A method according to claim 10, wherein the polymerization is conducted at a temperature of between about 10° C. and 80° C.*

*17. A method according to claim 10, wherein the amount of sulfur is between about 0.1 to 0.6% by weight of chloroprene.*

*18. A method according to claim 10, wherein the pH is at least about 10.*

*19. A method according to claim 10 wherein the organic polysulfide is benzothiazyl disulfide.*

*20. A method according to claim 10 wherein the organic polysulfide is benzyl polysulfides in which the number of sulfur atoms is equal to or greater than 3.*

*21. A method according to claim 10 wherein the organic polysulfide is 2,4,5-trichlorophenyl trisulfide.*

*22. A method according to claim 10 wherein the organic polysulfide is benzanilide disulfide.*

* * * * *